No. 682,057. Patented Sept. 3, 1901.
E. GERMAIN.
CUSHION TIRE.
(Application filed June 5, 1901.)
(No Model.)
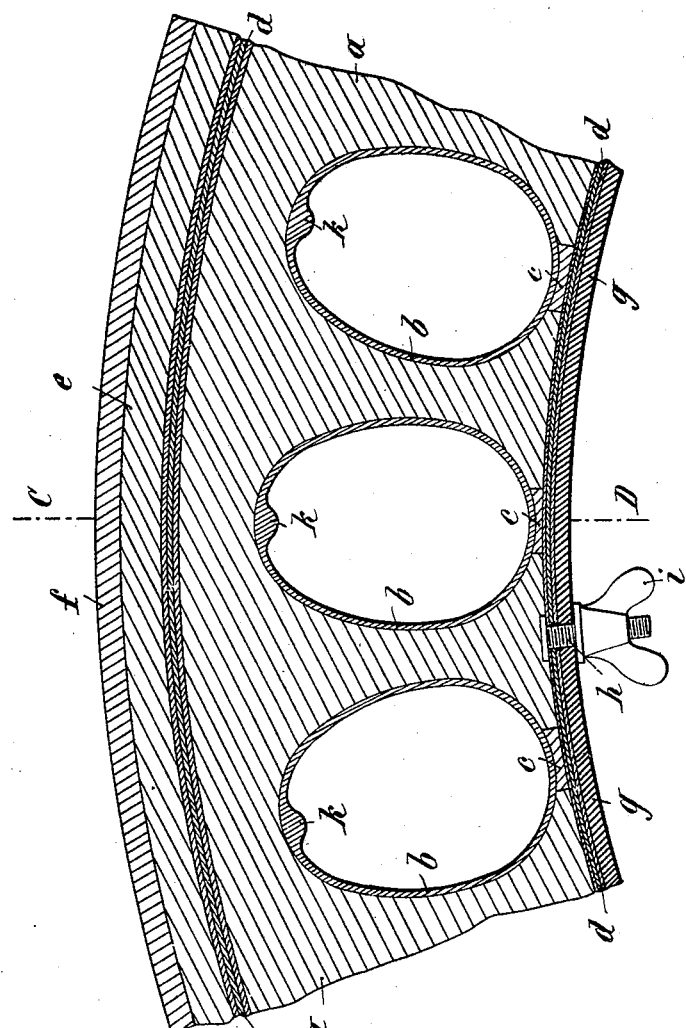
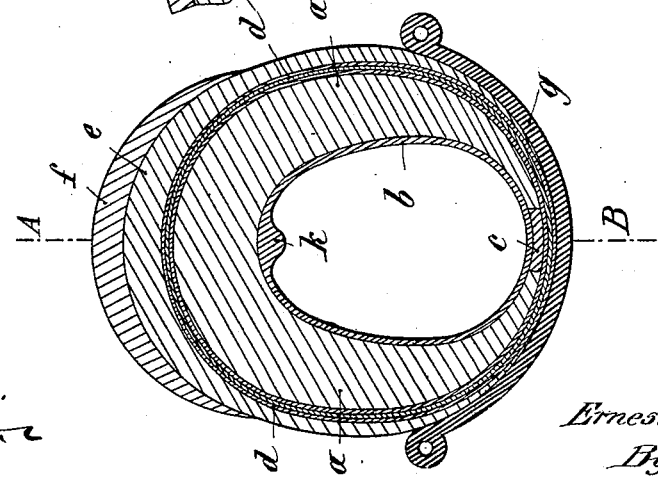

UNITED STATES PATENT OFFICE.

ERNEST GERMAIN, OF PARIS, FRANCE.

CUSHION-TIRE.

SPECIFICATION forming part of Letters Patent No. 682,057, dated September 3, 1901.

Application filed June 5, 1901. Serial No. 63,223. (No model.)

*To all whom it may concern:*

Be it known that I, ERNEST GERMAIN, mechanician, of 2 Boulevard de Strasbourg, in the city of Paris, Republic of France, have invented a Cushion-Tire, of which the following is a full, clear, and exact description.

This invention relates, primarily, to a system of pneumatic tires for the wheels of all kinds of vehicles and is also applicable to seats and seat-backs, saddles, cushions, mattresses, and the like.

The invention will be described as applied more particularly to the wheels of vehicles.

It is known that the principal defects of existing pneumatic tires are their frequent deflation and rapid wear. The leakage, rupture, and nipping of the air-chamber involve insecurity in running and often necessitate repairs which are tedious and ineffectual and entail the transport of numerous accessories. To obviate these objections, I have devised a system of pneumatic tire which may be secured to the wheel-rim without the aid of wires or thickened edges and which needs neither valve nor pump. This system of pneumatic tire comprises a cushion of soft or spongy rubber, in which are formed cells or cavities for the reception of rubber balls inflated with air at a pressure of several atmospheres, the said cushion being contained within one or several layers of rubber-coated canvas, inclosed in turn by an outer layer of rubber, which is provided with a rubber tread.

In order that the invention may be readily understood, I have illustrated it in the accompanying drawings, in which—

Figure 1 represents a transverse vertical section on line C D, Fig. 2, of my system of pneumatic tire. Fig. 2 is a longitudinal vertical section of the same on line A B, Fig. 1.

The same letters of reference denote like parts in both the figures.

As shown in the drawings, my system of tire consists, essentially, of a cushion $a$, of what is known in commerce as "soft" or "spongy" rubber, in which are molded, by means of cores placed in the mold, chambers or pockets of a form corresponding to that of the rubber balls $b$ employed. The balls $b$ are preferably made of compressed occlusive or self-sealing rubber, inflated with air at a pressure of several atmospheres, so as to be self-sealing on the withdrawal of the cause of puncture. In practice the balls would be made of a thickness of about two millimeters. The inflation of the balls $b$ is preferably effected before they are introduced into the cavities of the cushion $a$, which is provided with apertures $c$ at which to insert the balls, which cavities are afterward closed in any suitable manner. The cushion $a$, containing the air-inflated balls $b$, is enveloped in one or several layers of rubber-coated canvas $d$, which is partly sheathed with rubber $e$, provided with a rubber band $f$ to form the tread. The pneumatic tire thus constituted is of an internal diameter slightly less than the diameter of the rim $g$, so as to grip it firmly, and it is secured upon the latter by means of screws $h$, passed through the rim, and wing-nuts $i$.

The balls $b$ are preferably made of ovoid form in order to prevent the crushing of the tire in running, and they are thickened at $k$ toward the tread of the tire to prevent puncturing. The pockets in which the balls $b$ are contained are preferably as near as possible to the canvas covering at the side next the rim in order to prevent friction and wear of the balls. In practice the pockets would be spaced at about ten millimeters apart for motor-cars and about five millimeters apart for light vehicles, such as bicycles and the like. The balls would be from thirty to forty in number, according to the diameter and circumference of the tire. If from any cause one of the balls should become punctured, it would not even become deflated, as the surrounding soft rubber exerts a sufficient pressure on it, and it is itself sufficiently compressed to prevent any escape of air. Even if one of the balls should by way of exception become deflated the tire would still remain in running condition, and the renewal of a ball or balls can be effected at any moment after removal of the tire from the wheel.

Such is in principle my system of pneumatic tire, it being understood that the form, dimensions, and details may be varied without in any way departing from the nature of the invention.

I claim—

A cushion-tire, comprising a soft-rubber body portion, inflated ovate balls arranged in the body portion and having inwardly-extended thickened portions at the tread side, a casing of rubber-coated canvas, a rubber covering on the canvas and thickened at its tread side, and the protecting-band connected to said rubber casing, substantially as specified.

The foregoing specification of my pneumatic filling for wheel-tires, seats, saddles generally, cushions, mattresses, and the like signed by me this 23d day of May, 1901.

ERNEST GERMAIN.

Witnesses:
EUGENE GUYHUR,
MAURICE H. PIGNET.